(12) United States Patent
Lida et al.

(10) Patent No.: US 9,426,006 B2
(45) Date of Patent: Aug. 23, 2016

(54) LOW POWER PARTIAL FUNCTIONALITY COMMUNICATION LINK

(75) Inventors: Eyran Lida, Kfar Ha-Oranim (IL); Avi Avrahami, Cohav-Yair (IL); Alon Benzaray, Herzelia (IL); Nadav Banet, Kadima (IL); Micha Risling, Raanana (IL); Massad Eyal, Zichron Yaakov (IL); Zeev Brunin, Hod Hasharon (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 1838 days.

(21) Appl. No.: 12/185,832

(22) Filed: Aug. 5, 2008

(65) Prior Publication Data

US 2008/0291994 A1 Nov. 27, 2008

Related U.S. Application Data

(63) Continuation-in-part of application No. 11/703,080, filed on Feb. 7, 2007.

(60) Provisional application No. 61/056,410, filed on May 27, 2008.

(51) Int. Cl.
*H04N 7/26* (2006.01)
*H04L 27/00* (2006.01)

(52) U.S. Cl.
CPC .................................. *H04L 27/0008* (2013.01)

(58) Field of Classification Search
CPC .................................................... H04L 27/0008
USPC .................. 370/329, 358, 437, 535; 709/233
See application file for complete search history.

(56) References Cited

U.S. PATENT DOCUMENTS

| | | |
|---|---|---|
| 5,361,261 A | 11/1994 | Edem |
| 5,440,556 A | 8/1995 | Edem |
| 5,805,597 A | 9/1998 | Edem |
| 6,442,174 B1 | 8/2002 | Lin |
| 6,762,625 B1 | 7/2004 | Devnath |
| 7,068,609 B2 | 6/2006 | Huff |
| 7,249,271 B2 | 7/2007 | Shibata |
| 7,295,578 B1 * | 11/2007 | Lyle et al. ..................... 370/503 |
| 7,342,901 B1 | 3/2008 | Zhang et al. |
| 7,366,930 B2 | 4/2008 | Gutman |
| 7,469,311 B1 | 12/2008 | Tsu et al. |
| 7,603,574 B1 | 10/2009 | Gyugyi et al. |
| 7,787,387 B2 | 8/2010 | Huff |
| 2003/0179709 A1 | 9/2003 | Huff |
| 2003/0206564 A1 | 11/2003 | Mills et al. |
| 2005/0030808 A1 | 2/2005 | Brown et al. |
| 2005/0105545 A1 | 5/2005 | Thousand et al. |
| 2005/0111531 A1 | 5/2005 | Booth et al. |
| 2005/0114721 A1 | 5/2005 | Azadet et al. |
| 2006/0025181 A1 | 2/2006 | Kalofonos et al. |
| 2006/0117371 A1 | 6/2006 | Margulis |
| 2006/0184685 A1 | 8/2006 | Blasingame |
| 2006/0184813 A1 | 8/2006 | Bui |
| 2006/0227884 A1 | 10/2006 | Koga et al. |

(Continued)

*Primary Examiner* — Luat Phung
(74) *Attorney, Agent, or Firm* — Active Knowledge Ltd.

(57) ABSTRACT

A low power partial functionality communication link that includes a first mode of operation for transmitting a first high throughput data stream including a plurality of data types over wires, and a second low power partial functionality mode of operation for transmitting, over a subset of the wires used for transmitting the first data stream, a second low throughput bidirectional data stream that may include less data types than the first data stream.

28 Claims, 16 Drawing Sheets

(56) References Cited

U.S. PATENT DOCUMENTS

| | | |
|---|---|---|
| 2007/0011387 A1 | 1/2007 | Gaskins |
| 2007/0076722 A1 | 4/2007 | Ungerboeck et al. |
| 2007/0211728 A1 | 9/2007 | Kim et al. |
| 2008/0069004 A1 | 3/2008 | Huff |
| 2008/0117994 A1 | 5/2008 | Shetty |
| 2008/0172501 A1 | 7/2008 | Goodart et al. |
| 2008/0219289 A1 | 9/2008 | Harrison et al. |
| 2008/0239978 A1 | 10/2008 | Karam et al. |
| 2008/0253356 A1 | 10/2008 | Berman et al. |
| 2008/0285573 A1 | 11/2008 | Diab et al. |
| 2008/0288995 A1 | 11/2008 | Diab et al. |
| 2008/0304519 A1 | 12/2008 | Koenen et al. |
| 2009/0034518 A1 | 2/2009 | Diab |
| 2009/0154355 A1* | 6/2009 | Diab et al. .................. 370/236 |
| 2009/0154500 A1 | 6/2009 | Diab et al. |
| 2009/0161579 A1 | 6/2009 | Saaranen et al. |
| 2009/0196209 A1* | 8/2009 | Haartsen .................... 370/311 |
| 2010/0005503 A1 | 1/2010 | Kaylor et al. |

\* cited by examiner

LOW POWER PARTIAL FUNCTIONALITY COMMUNICATION LINK

CROSS-REFERENCE TO RELATED APPLICATIONS

This application is a continuation-in-part of application Ser. No. 11/703,080, filed on Feb. 7, 2007, incorporated herein by reference. This application also claims the benefit of U.S. Provisional Patent Application No. 61/056,410, filed on May 27, 2008, incorporated herein by reference.

BACKGROUND

A multimedia system transmitting, for example, video, audio, and controls may enter a standby mode, enabling limited performance, in order to reduced power consumption. In some cases, limited performance refers to transmitting only a subset of the data types that are transmitted in the non-standby mode. For example, a multimedia source in standby mode may still transmit and receive system control data that enable it to read the properties of a sink device, that is also in standby mode, to which it is connected. In other words, there is no need to turn on the source and/or sink devices in order to read their properties.

Current video, audio, or multimedia solutions transmit some or all of their standby and/or low power data types over dedicated wires. For example, a High-Definition Multimedia Interface (HDMI™) includes dedicated wires for DDC, HPD, and CEC controls. DisplayPort™ includes two wires for transmitting the auxiliary data. The above solutions implement the standby mode by turning off the transceiver(s) that are not required for transmitting the data types that are supported by the standby mode. For example, in HDMI, only the transceivers that are physically connected to the wires used for transmitting the standby mode data types are operated in standby mode. In other words, standard HDMI systems include dedicated control wires that are connected to dedicated modems, and only these modems operate in standby mode. Moreover, the standby mode bandwidth is much smaller than the regular bandwidth, and allocating dedicated wires for the standby mode increases the total number of required wires because the standby wires are not used for significantly increasing the bandwidth of the regular mode of operation.

BRIEF SUMMARY

In one embodiment, a transceiver includes a first mode of operation for transmitting data of at least two types, over at least a first subset of conductive wires included in a cable, wherein at least one of the data types is uncompressed high definition digital video and another data type is bidirectional data. The transceiver includes a second low power partial functionality mode of operation for transmitting and receiving data of at least one type over at least a second subset of the conductive wires used by the first mode of operation for transmitting the uncompressed high definition digital video, wherein at least one data type transmitted in the first mode of operation is not transmitted in the second low power partial functionality mode of operation.

In one embodiment, a device includes a transmitter for transmitting uncompressed high definition digital video multiplexed with control data over a set of conductive wires, and a receiver for receiving control data over at least a first subset of the conductive wires. The device includes a transceiver for transmitting and receiving bidirectional data over at least a second subset of the conductive wires used by the transmitter, wherein the transmitter and the transceiver do not operate simultaneously and the transmitter transmits at least one data type that is not transmitted by the transceiver.

In one embodiment, a communication link includes a first mode of operation for transmitting data of at least two types, over at least a first subset of conductive wires included in a cable, wherein at least one of the data types is uncompressed high definition digital video transmitted from a source device to a sink device and another data type is a first bidirectional data transmitted between the source device and the sink device. The communication link includes a second low power partial functionality mode of operation for transmitting a second bidirectional data between the source device and the sink device over at least a second subset of the conductive wires used by the first mode of operation for transmitting the uncompressed high definition digital video, wherein the first bidirectional data includes at least one data type that is not transmitted in the second bidirectional data.

In one embodiment, a device includes a first mode of operation for transmitting and receiving bidirectional data and transmitting uncompressed high definition digital video over at least a first subset of conductive wires included in a cable. The device includes a second low power partial functionality mode of operation for transmitting and receiving bidirectional data over at least a second subset of the conductive wires used by the first mode of operation for transmitting the uncompressed high definition digital video, wherein the ratio between the power consumption of the first mode of operation and the power consumption of the second low power partial functionality mode of operation is at least 3:1.

In one embodiment, a transceiver includes a first mode of operation for transmitting a first data stream including a plurality of data types over at least a first subset of conductive wires included in a cable, wherein the throughput of the first data stream is at least 1.1 Gbps. The transceiver includes a second low power partial functionality mode of operation for transmitting a second bidirectional data stream including less data types than the first data stream over at least a second subset of the conductive wires used for transmitting the first data stream, wherein the throughput of the second data stream is less than approximately $1/10$ of the throughput of the first data stream.

In one embodiment, a device includes a first mode of operation for transmitting, over at least a first subset of conductive wires included in a cable, a first data stream having a throughput of more than approximately 1.1 Gbps including at least two data types, wherein at least one of the data types is transmitted bidirectionally. The device includes a second low power partial functionality mode of operation for transmitting, over a second subset of the conductive wires used by the first mode of operation, a second bidirectional data stream having a throughput of less than approximately 100 Mbps, wherein at least one data type transmitted in the first stream is not transmitted in the second stream.

In one embodiment, a system includes a first mode of operation for transmitting, over at least a first subset of conductive wires included in a cable, a first asymmetric data stream including at least two data types. The system includes a second low power partial functionality mode of operation for transmitting, over a second subset of the conductive wires used by the first mode of operation, a second bidirectional data stream, wherein the ratio between the throughput of the first data stream and the throughput of the second data stream is at least approximately 10:1 and wherein at least one data type transmitted in the first mode of operation is not transmitted in the second low power partial functionality mode of operation.

Implementations of the disclosed embodiments involve performing or completing selected tasks or steps manually, semi-automatically, fully automatically, and/or a combination thereof. Moreover, depending upon actual instrumentation and/or equipment used for implementing the disclosed embodiments, several embodiments could be achieved by hardware, by software, by firmware, or a combination thereof. In particular, with hardware, embodiments of the invention could exist by variations in the physical structure. Additionally, or alternatively, with software, selected functions of the invention could be performed by a data processor, such as a computing platform, executing a software instructions or protocols using any suitable computer operating system.

BRIEF DESCRIPTION OF THE DRAWINGS

The embodiments of the present invention are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
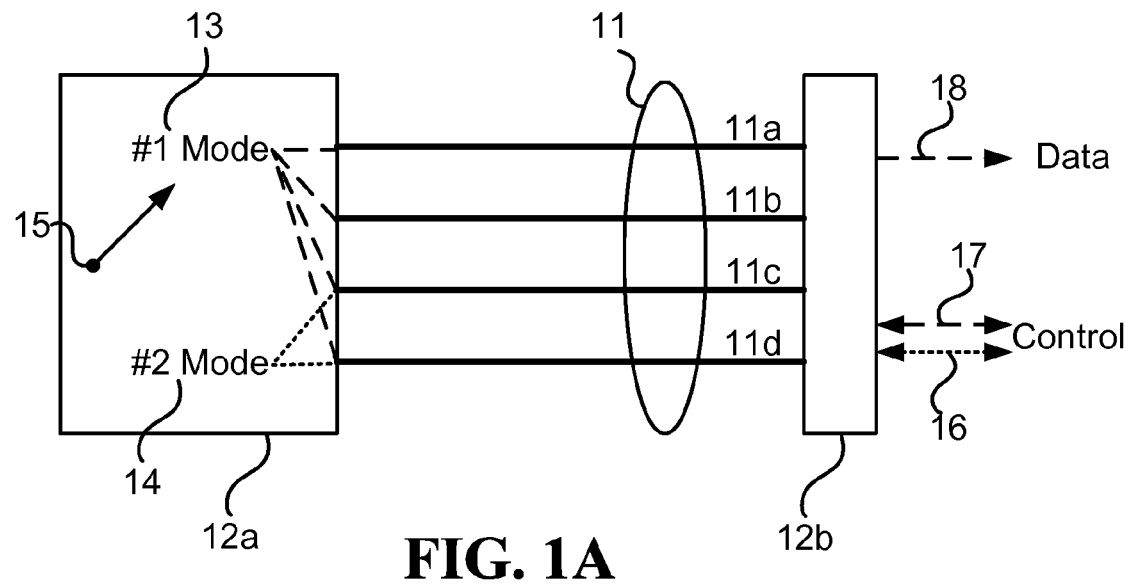
FIGS. 1A-1B are schematic diagrams of one embodiment of the invention.

In the following description, numerous specific details are set forth. However, the embodiments of the invention may be practiced without these specific details. In other instances, well-known hardware, software, materials, structures and techniques have not been shown in detail in order not to obscure the understanding of this description. In this description, references to "one embodiment" or "an embodiment" mean that the feature being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some flow diagrams operations are described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed.

The term "different data types" or "data types" or "types of data" as used herein denotes symbols that are used for different purposes and/or feature different characteristics. Examples of different data types include, but are not limited to: video pixel data; audio data; video synchronization control data, such as horizontal and vertical video picture synchronizations; video system controls, such as CEC, HPD and DDC signals; or general data transmissions, such as Ethernet data, USB data, or RS232 data; or infra-red (IR) control data. The data types may also be differentiated by features such as time sensitivity characteristics of the data, the required quality of transmission associated with the data, or the required throughput for each type of data. Examples of such data types include, but are not limited to: (i) time sensitive data, such as video pixel data or audio data, and time insensitive data, such as Ethernet data and video system controls; or (ii) data requiring high transmission quality, such as video synchronization controls or video system controls, and data requiring relatively low transmission quality, such as video pixel data.

The term "multi data type communication link" (MDTCL) as used herein denotes a communication link that transfers at least two different data types. The different data types may be multiplexed into one or more data streams that are transmitted over the MDTCL by the same one or more modems. In the embodiments of the present invention, a MDTCL comprises at least one active mode of operation and at least one low-power partial-functionality (LPPF) mode of operation. While in the LPPF mode of operation, the MDTCL: (i) consumes less power than the power consumed in the active mode of operation, (ii) transmits at a lower throughput than the throughput transmitted in the active mode of operation, (iii) transfers only a subset of the data types that are transferred in the active mode of operation, and (iv) optionally transfers one or more low bandwidth data types that are not transferred in the active mode of operation.

It is to be understood that the communication channel is not turned off while operating in the LPPF mode of operation. For example, assuming the LPPF mode of operation is utilized for transmitting system control data, there should be no need to establish the communication channel each time a system control datum is to be transmitted. It is also to be understood that the LPPF is a mode of operation and therefore it may transmit data repetitively without changing the mode of operation. In one embodiment, the LPPF mode of operation is non isochronous and non mesochronous.

The term "high definition" as used herein denotes at least 720p, 1080i with a total bitrate of more than 1 Gbit per second; wherein the total bitrate equals to the number of lines times the number of columns times the refresh rate times the number of bits per pixel.

Figure 3:
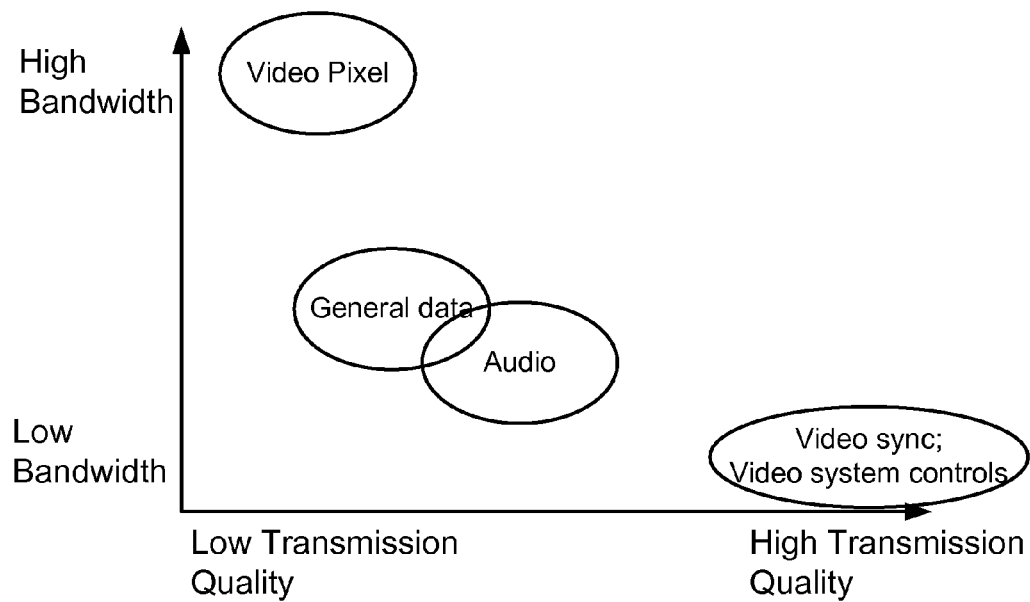
FIGS. 3-4 illustrate data types in accordance with one embodiment of the invention.
Figure 4:
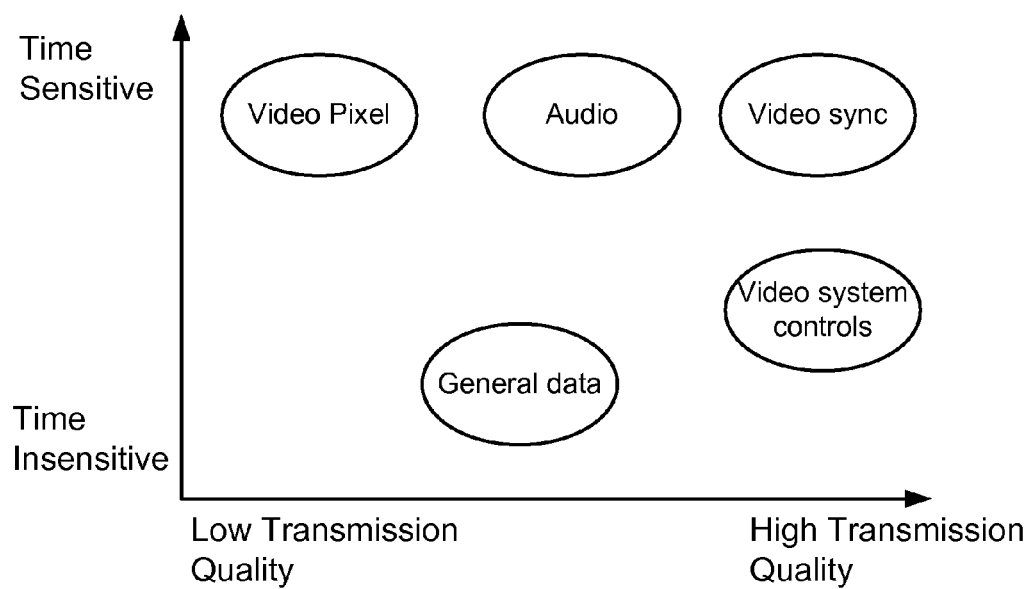

FIG. 3 illustrates different data types as a function of the required transmission quality and the required bandwidth. As illustrated, video pixel data requires high bandwidth and low transmission quality; general data, audio data, video synchronization control data, and video system control data all require lower bandwidth and require higher transmission quality in increasing order. FIG. 4 illustrates different data types as a function of the required transmission quality and the required time sensitivity. As illustrated, video pixel data, audio data, and video synchronization control data all require strict timing and require transmission quality in increasing order; general data, such as Ethernet, RS232 data, or USB data, and video system control data are both less time sensitive and require transmission quality in increasing order. It is to be understood that FIGS. 3 and 4 are just schematic illustrations and should not limit the scope of the disclosed embodiments.

In one embodiment, a communication link having at least two modes of operation, operating over the same physical media, connects between a sink device and a source device. As a non limiting example, the sink device may be a display device and the source device may be an HDMI source or an Ethernet source. The link identifies the source and operates according to the type of the source.

FIG. 1A illustrates one embodiment of a MDTCL having two modes of operation. The MDTCL has two transceivers (12a, 12b). A first mode of operation 13, referred to as the active mode, transmits relatively low throughput bidirectional control signals 17 and relatively high throughput unidirectional data signals 18, over the four conductive wires (11a, 11b 11c, 11d) of the cable 11. A second mode of operation 14, referred to as the low-power partial-functionality (LPPF) mode, transmits relatively low throughput bidirectional control signals 16, over a subset (11c, 11d) of the conductive wires of the cable 11. The selector 15 illustrates that the required mode of operation may be set as needed. In one example, the bidirectional control signals 17 are multi media controls and/or HDMI controls; the unidirectional data signals 18 are uncompressed high definition digital video signals; and the bidirectional control signals 16 are standby signals.

Optionally, in the active mode of operation 13, the high throughput data 18 is transmitted over the four conductive wires (11a-11d) of the cable 11 and the control data 17 is multiplexed with the high-throughput data 18. Alternatively (not shown in the drawings) the high throughput data 18 and the multiplexed controls 17 are transmitted over a first subset of the conductive wires of the cable 11, and the controls 16 of the LPPF mode of operation 14 are transmitted over a subset of the first subset. Optionally, the cable 11 may be one of the following cables: CAT5, CAT5e, CAT6, CAT6a, CAT7, or coax.

In one embodiment, the MDTCL has two or more LPPF modes of operation, featuring different power consumptions, transfer of different data types, and/or different available functionalities. A few examples of LPPF functionalities include: transferring Ethernet without video, transferring the system controls, transferring audio, or a combination thereof. According to another example, the LPPF mode of operation may transfer one or more of the following data types: standby control data, multimedia control data, auto-negotiation data, topology discovery data, network addressing data, general data, or consumer electronic control (CEC) data. Examples of electronic devices which may take advantage of such an LPPF mode of operation include one or more of the following: a display (such as a television, projector, or plasma display), a multimedia source, an audio system, a receiver, a tuner, an amplifier, or an HDMI compatible device.

Figure 5:
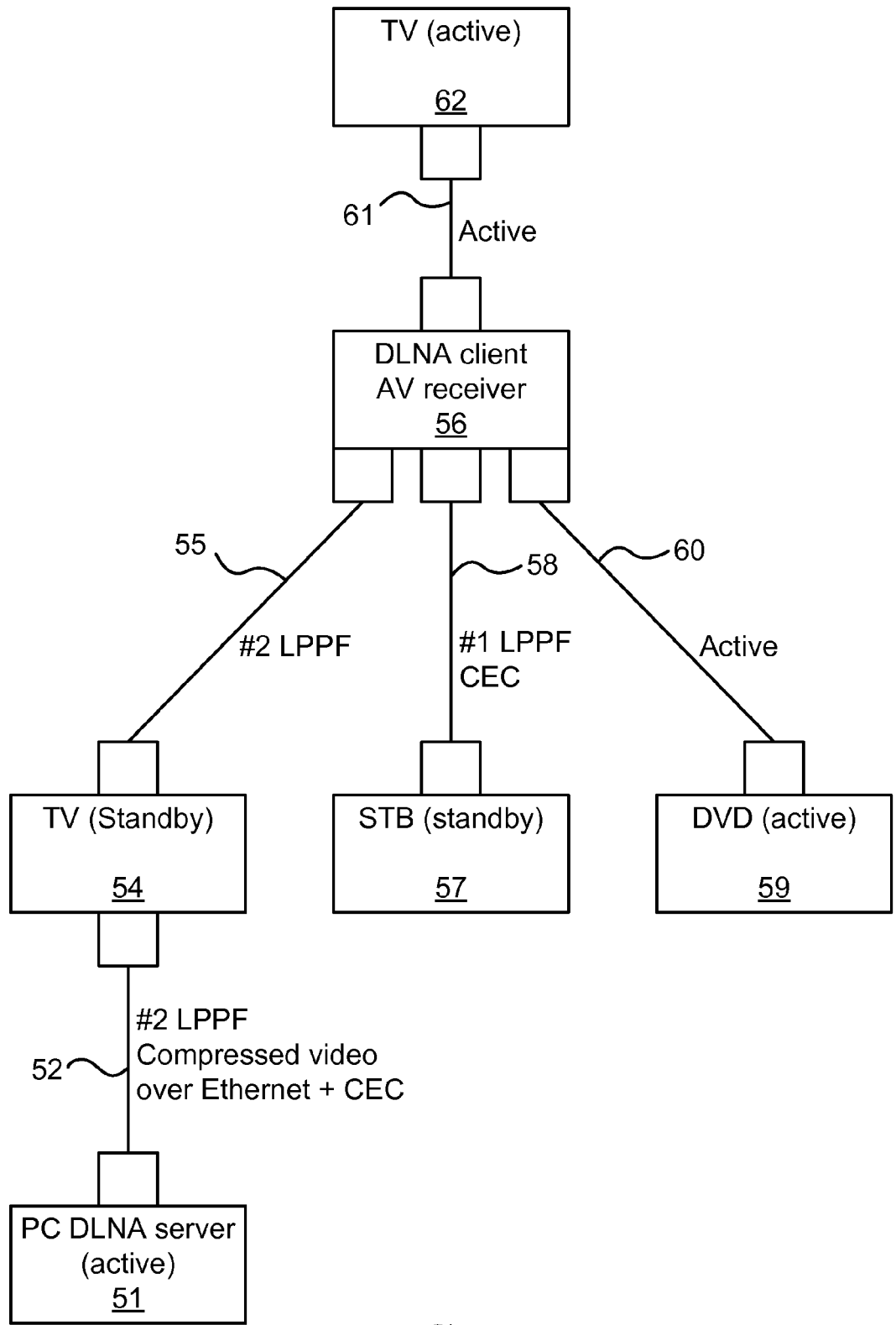
FIG. 5 illustrates a MDTCL in accordance with one embodiment of the invention.

FIG. 5 illustrates one embodiment of a MDTCL having one active mode of operation and two LPPF modes of operation. The different modes of operations are implemented using multi function transceivers denoted in FIG. 5 by small squares. The multi function transceivers have active, #1 LPPF, and #2 LPPF modes of operations. As illustrated, the DVD 59 transmits uncompressed content to the TV 62. Therefore, MDTCLs 60 and 61 are in the active mode of operation, i.e. the transceivers are in their active mode. The communication is transmitted through the DLNA compliant audio video (AV) receiver with DLNA client capabilities 56. The PC DLNA server 51 transmits to the TV 62 CEC communications and a compressed video stream using DLNA over Ethernet. Therefore, MDTCLs 52 and 55 operate in the #2 LPPF mode of operation which supports the required functionalities, e.g. CEC transactions and compressed video over Ethernet. The transceivers implementing the #2 LPPF mode of operation consume less power than the power consumed when operating in the active mode of operation. As illustrated, PC 51 is connected to TV 62 in a Daisy-chain through TV 54. TV 54 may be in standby mode. In order to save power while supporting the various MDTCL modes of operation, TV 54 may have a plurality of standby modes corresponding to the MDTCL modes of operation. In one embodiment, the standby mode of operation is determined by the MDTCL mode of operation. The STB 57 is in standby mode. Therefore, MDTCL 58 operates in the #1 LPPF mode of operation, which supports only CEC transactions. The TV 62 receives uncompressed video from DVD 59 and compressed video from PC 51 and, as an example, may use the two streams for displaying picture in picture.

In one embodiment, the LPPF modes of operation and their corresponding standby modes are determined according to one or more of the following: (i) the amount of the transmitted bandwidth, (ii) the type of transmitted data, or (iii) the required functionality of the MDTCL. Examples of three LPPF modes of operation include the following: (i) an LPPF mode for transmitting video system control data, (ii) an LPPF mode for transmitting video system control data and audio data, and (iii) an LPPF mode for transmitting video system control data and general data, such as Ethernet data. The third example may also be considered as a low power mode because the Ethernet transmission consumes less power than uncompressed video transmission. In one embodiment, 100 Mb Ethernet is transmitted over two pairs of wires of a CATx cable, and video system control data is transmitted over the other two pairs of wires of the CATx cable.

Figure 2A:
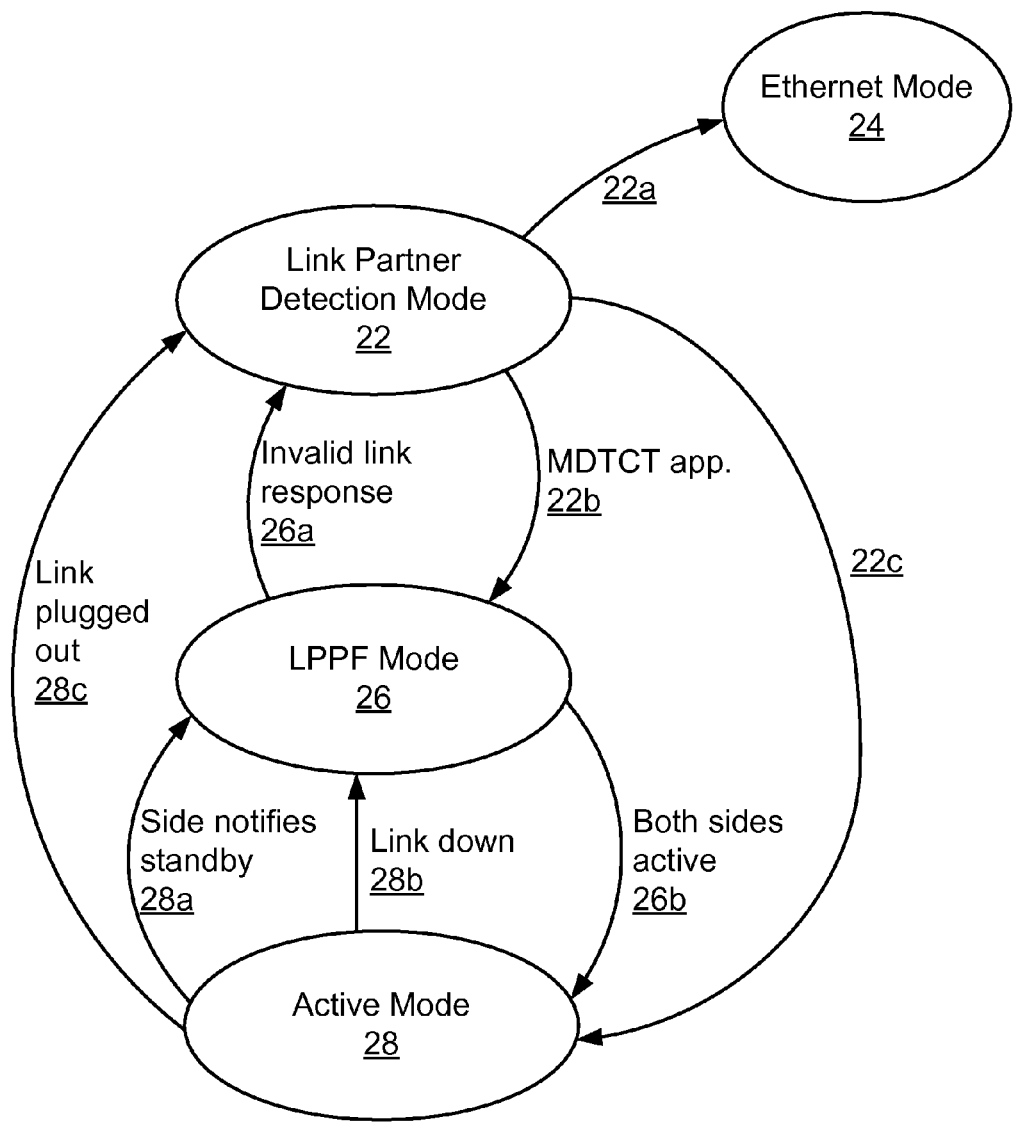
FIGS. 2A-2B are state machines of embodiments of the invention.

FIG. 2A illustrates one embodiment of a state machine for operating a MDTCL over the same physical media (e.g. a copper cable). In this embodiment, the communication link has an Ethernet mode of operation 24 and two MDTCL modes of operation, named LPPF mode of operation 26 and active mode of operation 28. Optionally, during the Link Partner Detection mode of operation 22, each side connected to the link performs auto negotiation with the other side, if exists. The Link Partner Detection mode of operation 22 may be entered upon waking up, turning on, or resetting. In one embodiment, one or more interfaces are tested. For example, an Ethernet interface may be tested 22a; if the Ethernet interface is established, the state of the communication link changes to Ethernet mode of operation 24; otherwise, a MDTCL application, such as HDMI, may be tested 22b; if both sides support the MDTCL properties, the state of the communication link changes to LPPF mode of operation 26. Optionally, if the link is plugged out (28c, 28d) or there is an invalid link response 26a, the MDTCL switches back to the link partner detection mode 22.

Figure 1B:
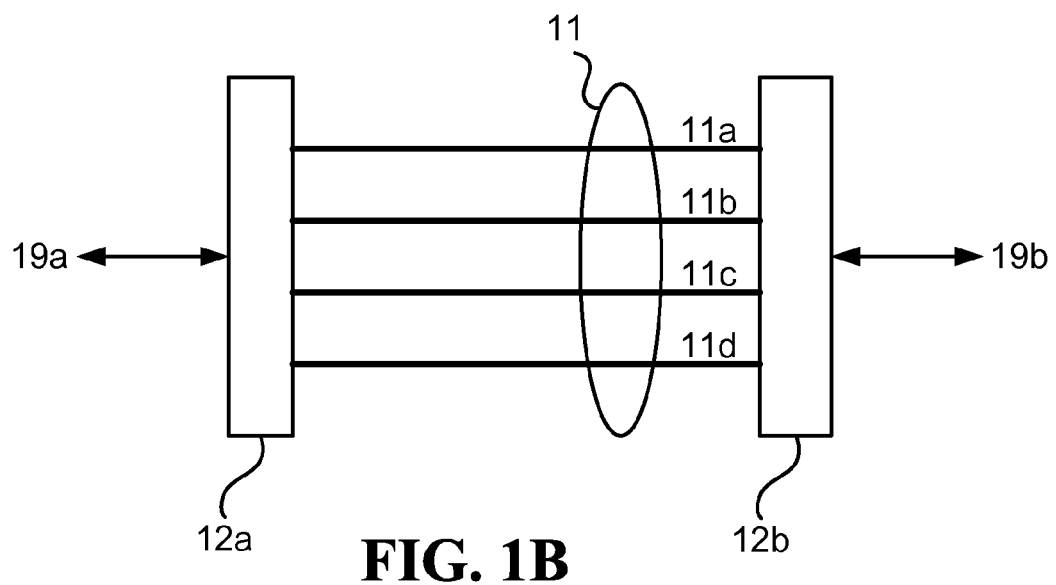

Referring to FIG. 1B and FIG. 2A, optionally, upon entering the LPPF mode of operation 26, the communication link receives from both sides (19a, 19b) information about their modes of operation. If both sides (19a and 19b) are in active modes of operation, the communication link switches to its active mode of operation 28. If at least one of the sides (19a or 19b) is in standby mode, the communication link stays in the LPPF mode of operation 26.

While operating in the active mode of operation 28, if the link is down 28b or one of the sides (19a, 19b) changes its mode to #1 LPPF or #2 LPPF (28a, 28e), the communication link enters the LPPF mode of operation 26. Optionally, during the active mode of operation 28, one of the following combinations of data types may be transmitted over the communication link: uncompressed high definition digital video data and bidirectional control data, uncompressed high definition digital video and audio data and bidirectional control data, uncompressed high definition digital video and audio data and bidirectional control data and Ethernet general data.

Optionally, during the LPPF mode of operation 26, the communication link is able to transmit control signals needed for the system to determine whether it should change its mode of operation, and/or perform other standby mode activities, such as the standby mode activities defined by DVI™ (Digital Visual Interface), HDMI™, DisplayPort™, or DIVA™ standards. In one embodiment, the LPPF mode of operation 26 may support one or more of the following control signals: (i) control signals needed for nodes in the network to go into and out of standby mode, (ii) control signals supporting network topology changes performed while the devices are in standby mode, (iii) control signals for finding the network topology while some of the network is in standby, or (iv) control signals for assigning identification numbers to the various nodes in the network while the network is in standby mode. In one embodiment, the LPPF mode of operation 26 supports the control signals defined by the HDMI standard. For example, the LPPF mode of operation 26 may support one or more of the following HDMI control signals: EDID DDC transactions, HPD, 5V status signals, or transparent transfer of CEC transactions.

Figure 2B:
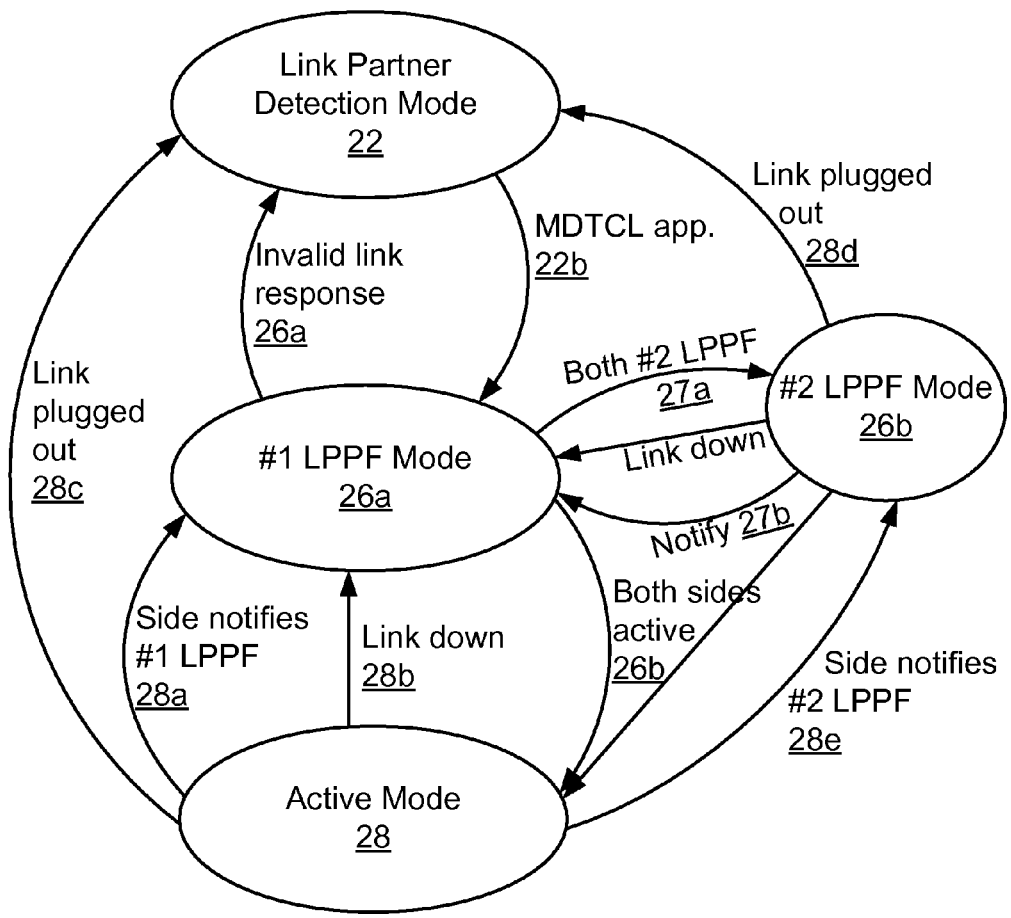

FIG. 2B illustrates one embodiment of a state machine for operating a MDTCL over the same physical media. In this embodiment, the multi function transceivers used by the MDTCL have an active mode of operation 28 and two LPPF modes of operation (26a, 26b). In one example, each mode of the multi function transceiver processes different data type(s) or different combination(s) of data types, such that the different modes of operation (26a, 26b, 28) feature different functionalities and optionally different power consumptions.

During the link partner detection mode 22, the system sets the function(s) to be operated by the multi function transceiver. For example, if the devices connected to both sides of the MDTCL are in their active mode of operation, the multi function transceivers are set to be (22c) in the active mode of operation 28. If a first device connected to the MDTCL is in the active mode, and a second device connected to the MDTCL is in another mode, a communication takes place between the two devices, optionally resulting in the second device changing its mode to the active mode of operation 28, or the first device changing its mode to another mode that is accepted by the second device. The MDTCL may also switch between the various LPPF modes of operation (27a, 27b). For example, assuming a first and a second device connected to the MDTCL are in the #1 LPPF mode of operation 26a, the first device may transmit a message to the second device that may agree to switch mode, resulting in both devices switching 27a to the #2 LPPF mode of operation 26b. Alternatively, assuming the first and the second device connected to the MDTCL are in the #2 LPPF mode of operation 26b, the first device may notify the second device it switches to the #1 LPPF mode of operation, resulting in both devices switching to the #1 LPPF mode of operation.

Figure 2C:
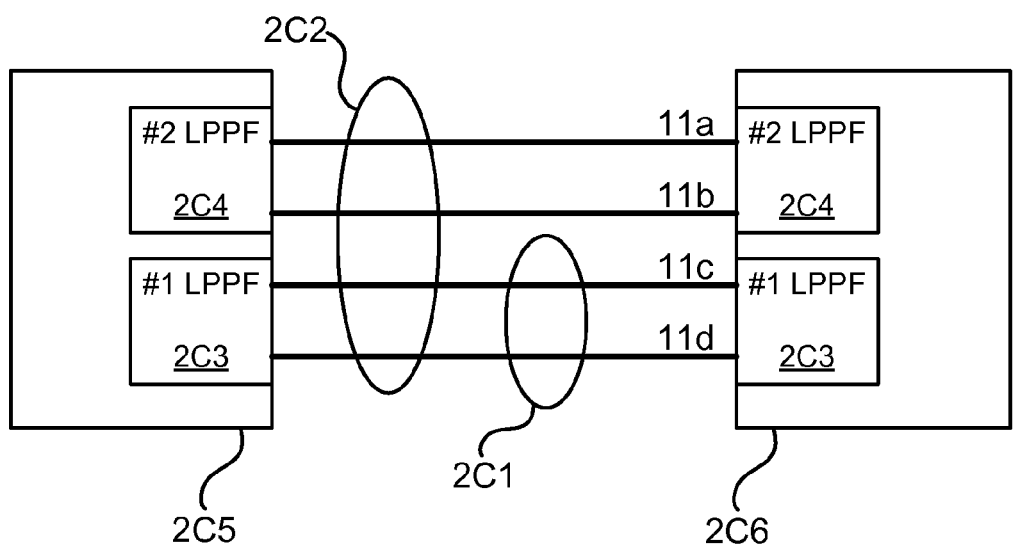
FIG. 2C is a schematic diagram of one embodiment of the invention.

FIG. 2C illustrates a configuration supporting the feature of switching between the various LPPF modes of operation using messages. In the illustrated embodiment, the #1 LPPF mode of operation 2C1 transmits over pairs of wires 11c and 11d. The #2 LPPF mode of operation 2C3, which transmits over the four pairs of wires (11a-11d), transmits approximately the same data over pairs of wires 11c and 11d as the #1 LPPF mode of operation and transmits additional data over pairs of wires 11a and 11b. Because the same data transmissions over the same pairs of wires are used by the #1 and the #2 modes of operations, it is possible to switch between the #1 and the #2 modes of operations using messages transmitted over pairs of wires 11c and 11d.

Various auto negotiations may be implemented for different devices running different interfaces. The various auto negotiation protocols may differ in the following non-limiting features: (i) using different conductive wires for identification. For example, Ethernet uses the pair of conductive wires A and B, while a MDTCL may use the pair of conductive wires C and D; (ii) using different transmission amplitudes. For example, a MDTCL may utilize amplitude which is below the lower threshold of Ethernet; or (iii) using different pulse shapes. For example, a MDTCL may use a pulse shape that is different from the pulse shape used by Ethernet.

US patent application Ser. No. 11/703,080, filed on Feb. 7, 2007, which is incorporated herein by reference in its entirety, discloses methods and systems, which may be used with the discussed embodiments, for transmitting the following data types over the same wires: (i) uncompressed high definition digital video data, (ii) uncompressed audio data, (iii) bidirectional control data, and and/or (iv) general data, such as Ethernet.

Power Saving Techniques

Since the bandwidth of the LPPF mode of operation is significantly lower than the bandwidth of the active mode of operation, the LPPF mode of operation may utilize one or more of the following techniques for power reduction.

Figure 16:
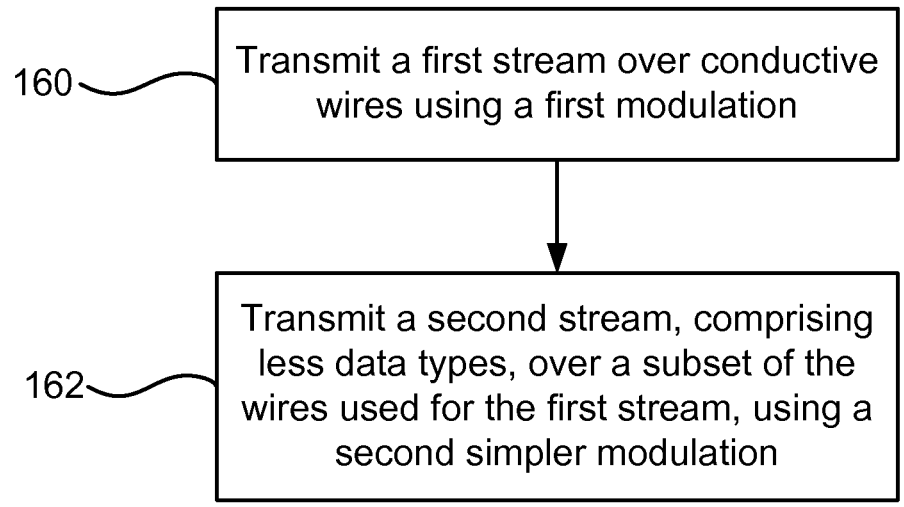
FIG. 16 is a flow diagram of a modulation based method in accordance with one embodiment of the invention.

The LPPF mode of operation may utilize a simpler modulation scheme than the modulation scheme used in the active mode of operation 28. FIG. 16 is a flow diagram illustrating one method comprising the following steps: in step 160, transmitting in a first mode of operation a first data stream, comprising at least two data types, over conductive wires using a first modulation scheme. And in step 162, transmitting in a second LPPF mode of operation a second data stream, comprising less data types than the first data stream, over at least a subset of the conductive wires used for transmitting the first data stream, using a second modulation scheme that is simpler than the first modulation scheme.

Figure 17:
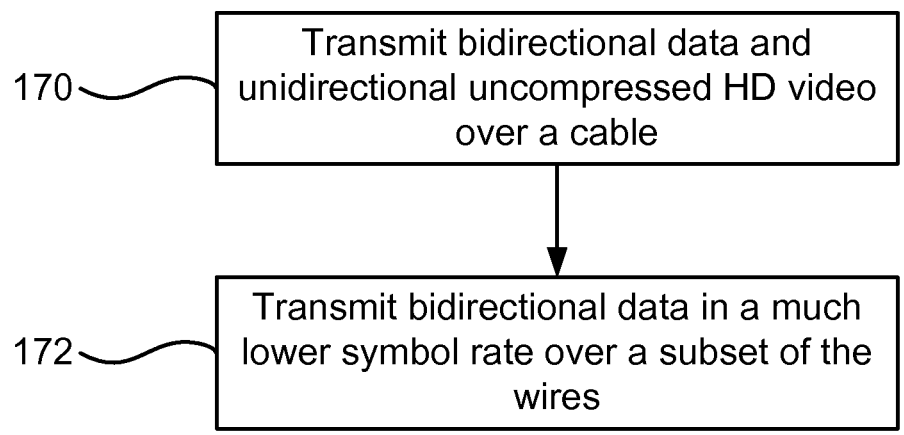
FIG. 17 is a flow diagram of a symbol rate based method in accordance with one embodiment of the invention.

The LPPF mode of operation may utilize a much lower symbol rate than the symbol rate used in the active mode of operation 28. FIG. 17 is a flow diagram illustrating one method comprising the following steps: in step 170, transmitting in a first mode of operation bidirectional data between a source device and a sink device and unidirectional uncompressed high definition digital video from the source device to the sink device over at least a first subset of conductive wires comprised in a cable. And in step 172, transmitting in a second LPPF mode of operation bidirectional data between the source device and the sink device over at least a second subset of the conductive wires used by the first mode of operation for transmitting the unidirectional uncompressed high definition digital video. Wherein, the bidirectional data transmitted in the second LPPF mode of operation comprises at least one data type that is also transmitted in the bidirectional data of the first mode of operation, and the transmissions in the second LPPF mode of operation are have a much lower symbol rate compared to the transmissions in the first mode of operation.

The transmissions in the LPPF mode of operation may utilize a subset of the wires used for the active mode of operation 28. For example, when operating over a multi twisted pairs cable, such as CAT5e, one pair may be used for transmitting and one pair for receiving.

Instead of transmitting full duplex over the same wires, in the LPPF mode of operation, a unidirectional transmission may be transmitted over a first set of wires and a unidirectional transmission may be transmitted to the opposite side over a second set of wires, where the first and second sets of wires are also used by the active mode of operation. Utilizing unidirectional transmissions in the LPPF mode of operation reduces the receiver's signal analysis workload and as a result reduces the receiver's power consumption.

low amplitude transmissions may be used in the LPPF mode of operation.

In the LPPF mode of operation, the link may be activated only when valid data is available for transmissions, instead of activating the link also when there is no data to transmit, usually using idle symbols.

In the LPPF mode of operation, the link may be activated on request and may be maintained only when additional transmissions are expected soon. Synchronization and timing problems as a result of turning off the link may be resolved by a self clocking code, such as Manchester II, wherein the clock is embedded within the data.

In the LPPF mode of operation, signal acquisition may be performed each time a transaction is to be performed.

In the LPPF mode of operation, a modem having at least two modes of operation may be utilized as further discussed below. The plural modes modem may be implemented as one or more modems connected to the same media through the same analog front ends or through different analog front ends. In one embodiment, the first mode of operation is a 10 Gbps Ethernet modem and the second mode of operation is a low power modem utilizing one or more of the above described techniques (lower frequency, fewer conductive wires, low amplitude, partial functionality, maintaining the link, Synchronization, signal acquisition, lower symbol rate, or modem with two modes of operation).

Figure 18:
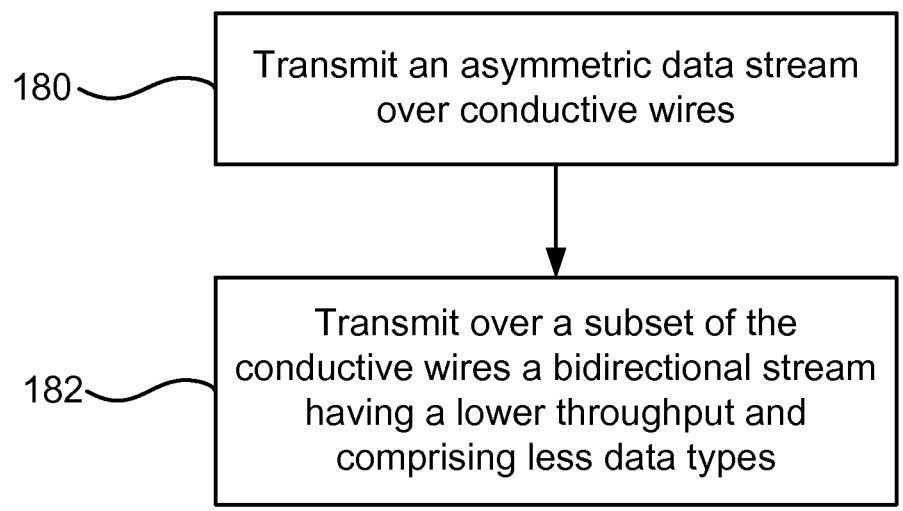
FIG. 18 is a flow diagram of a throughput based method in accordance with one embodiment of the invention.

FIG. 18 is a flow diagram illustrating one method comprising the following steps: in step 180, transmitting in a first mode of operation, over a cable comprising conductive wires, a first asymmetric data stream comprising at least two data types. And in step 182, transmitting in a second LPPF mode of operation, over a subset of the conductive wires used by the first mode of operation, a second bidirectional data stream having a much lower throughput (e.g. at most approximately 1/10 of the throughput) and comprising less data types than the first asymmetric data stream.

MDTCL Modems

Figure 6:
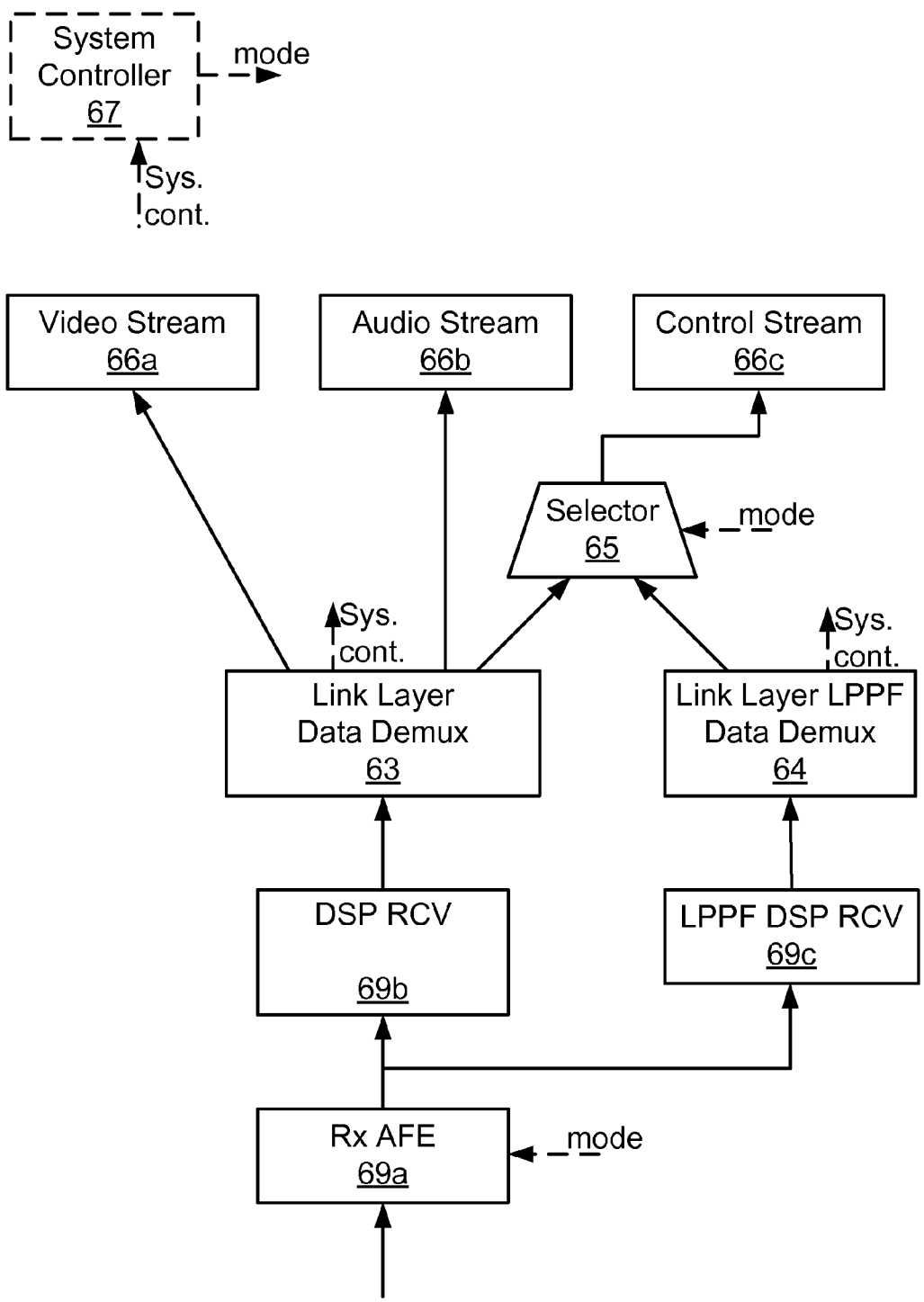
FIG. 6 illustrates a receiving path in accordance with one embodiment of the invention.

FIG. 6 illustrates one example of a receiving path of a receiver used in a MDTCL. The illustrated receiver has (i) an active mode of operation, in which it receives a video stream 66a, an audio stream 66b, and a control stream 66c; and (ii) an LPPF mode of operation, in which it receives only the control stream 66c. While the receiver is in its active mode of operation, the video stream 66a, the audio stream 66b, and the control stream 66c are received from the communication medium through the active mode of operation version of the receiver's analog front end 69a, the active mode of operation version of the DSP receiver 69b, and the active mode of operation version of the link layer data demultiplexer 63. The optional selector 65 selects the control stream from the active path. In another embodiment, the selector 65 is not required because the control stream received in the active mode of operation is forwarded to a first destination and the control stream received in the LPPF mode of operation is forwarded to a second destination. While the receiver is in its LPPF mode of operation, the control stream 66c is received from the communication medium through the LPPF mode of operation version of the receiver's analog front end 69a, the LPPF mode of operation version of the DSP receiver 69c, and the LPPF mode of operation version of the link layer data demultiplexer 64. As illustrated by FIG. 6, in one embodiment, at least some part of the receiver's analog front end is shared between the active receiving path and the LPPF receiving path because the different data types are received from the same wires. The optional system controller 67 sets the mode of operation of the selector 65 and the receiver's analog front end 69a according to the system controls received from the link layer data demultiplexer 63 the link layer LPPF data demultiplexer 64.

Figure 7:
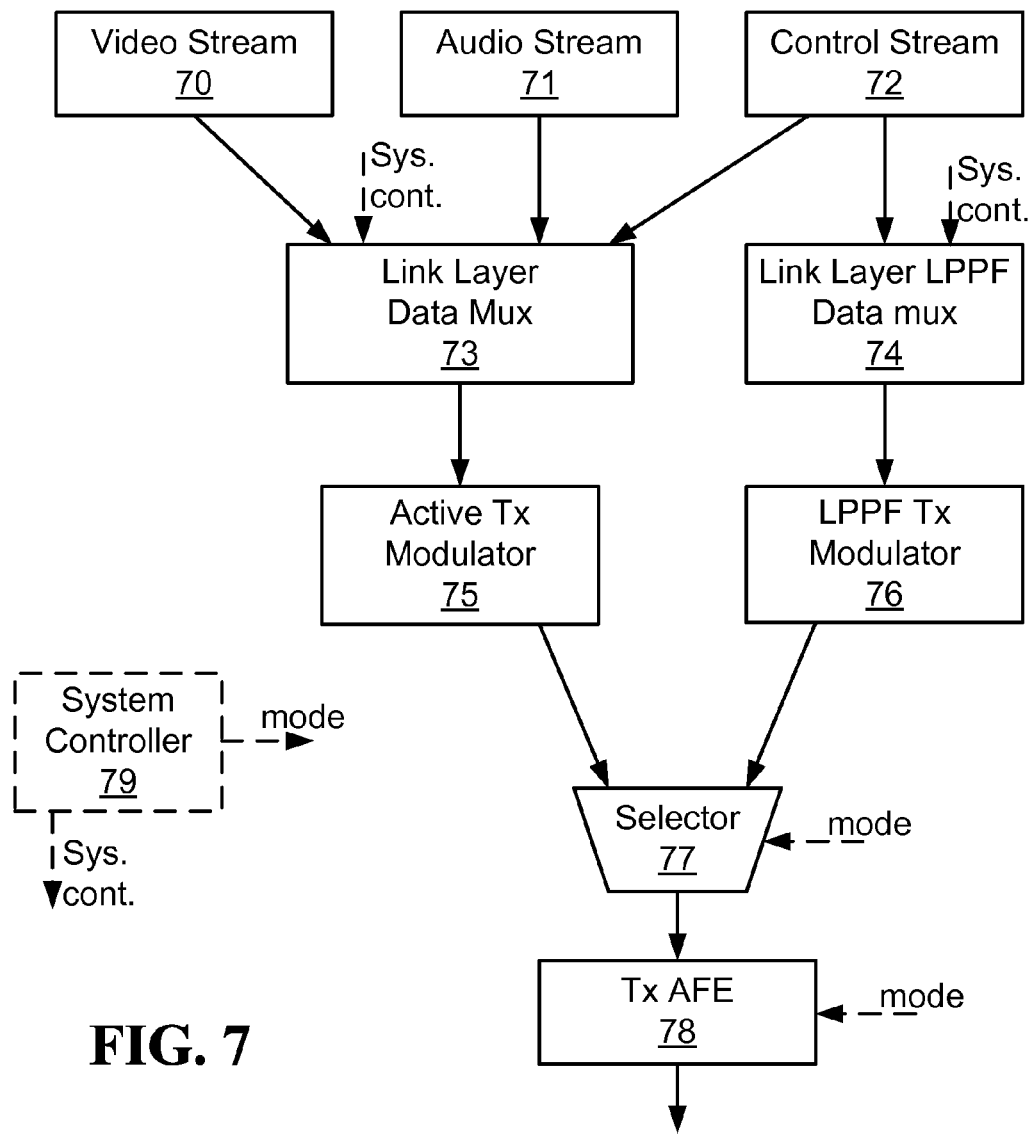
FIG. 7 illustrates a transmitting path in accordance with one embodiment of the invention.

FIG. 7 illustrates one example of a transmitting path of a transmitter used in a MDTCL. The illustrated transmitter has (i) an active mode of operation, in which it transmits a video stream 70, an audio stream 71, and a control stream 72; and (ii) an LPPF mode of operation, in which it transmits only the control stream 72. While the transmitter is in its active mode of operation, the video stream 70, audio stream 71, and control stream 72 are transmitted to the communication medium through the active mode of operation version of the link layer data multiplexer 73, the active mode of operation version of the transmit modulator 75, and the active mode of operation version of the transmitter's analog front end 103a. The optional selector 77 selects the video stream 70, audio stream 71, and control stream 72 from the active path. In another embodiment, the selector 77 is not required because the streams of the active mode of operation are forwarded to a first analog front end and the control stream of the LPPF mode of operation is forwarded to a second analog front end. While the transmitter is in its LPPF mode of operation, the control stream 72 is transmitted to the communication medium through the LPPF mode of operation version of the link layer LPPF data multiplexer 74, the LPPF mode of operation version of the transmit modulator 76, and the LPPF mode of operation version of the transmitter's analog front end 78. As illustrated by FIG. 7, in one embodiment, at least some part of the transmitter's analog front end is shared between the active transmitting path and the LPPF transmitting path because the different data types are transmitted over the same wires. The optional system controller 79 sets the mode of operation of the selector 77 and the transmitter's analog front end 78 using the illustrated "mode" signal, and provides the system controls to the link layer data multiplexer 73 and to the link layer LPPF data multiplexer 74.

MDTCL Transceivers

Figure 8:
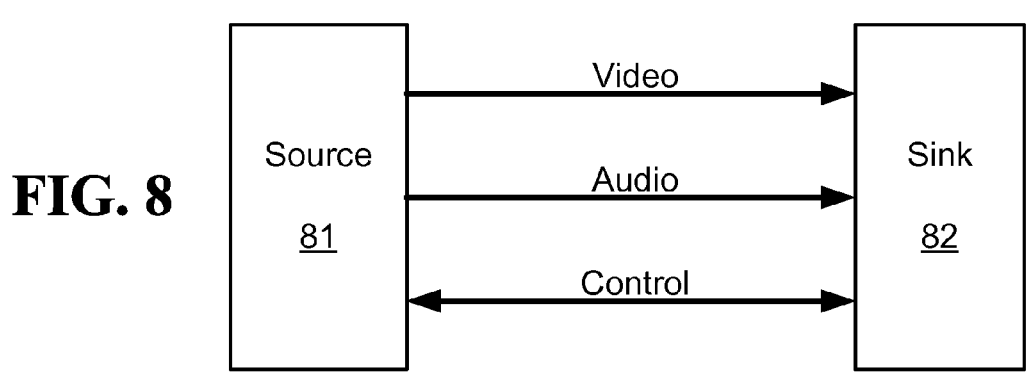
FIG. 8 is a schematic diagram of one embodiment of the invention.
Figure 9:
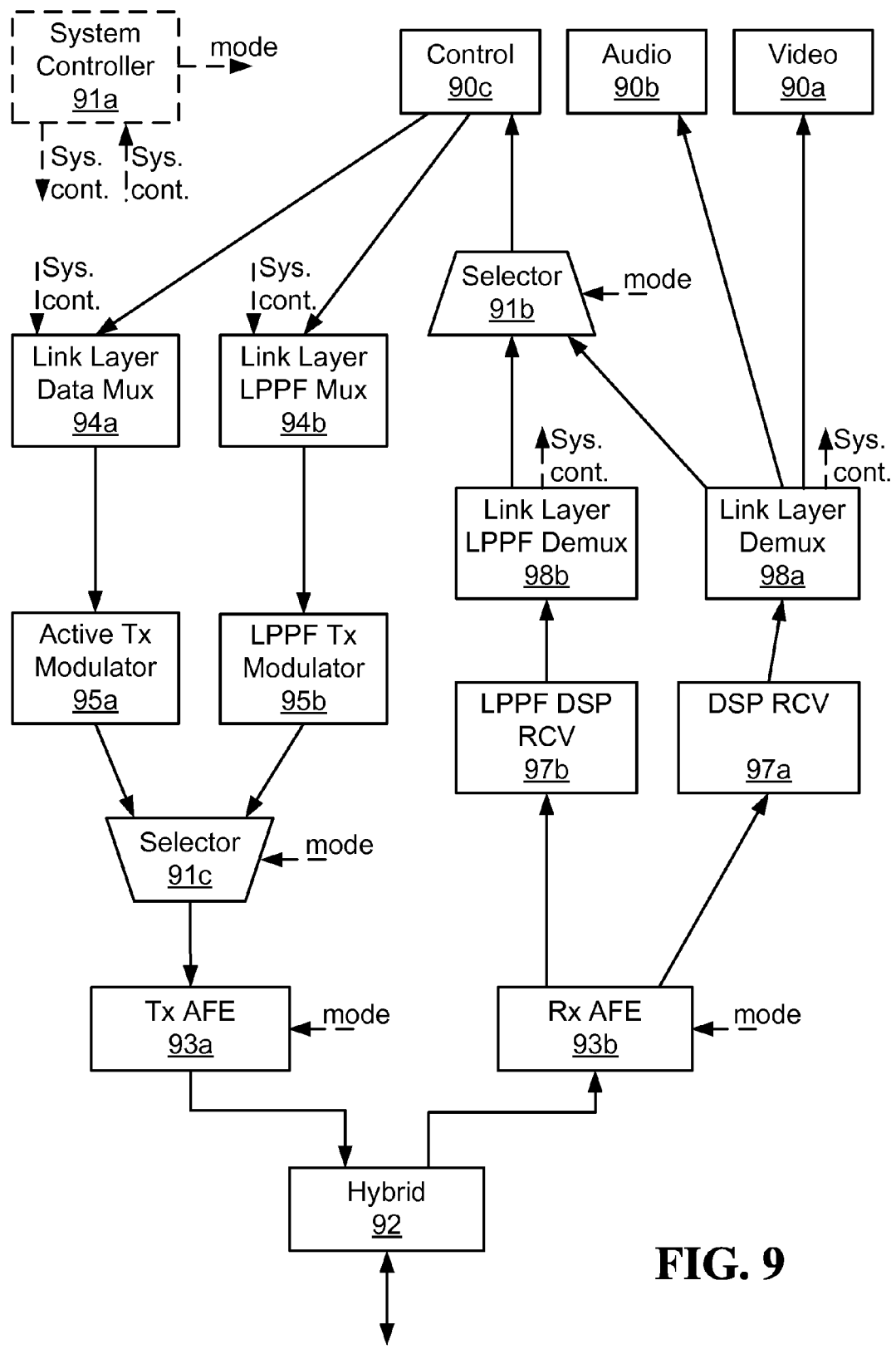
FIG. 9 illustrates a sink side of a MDTCL in accordance with one embodiment of the invention.
Figure 10:
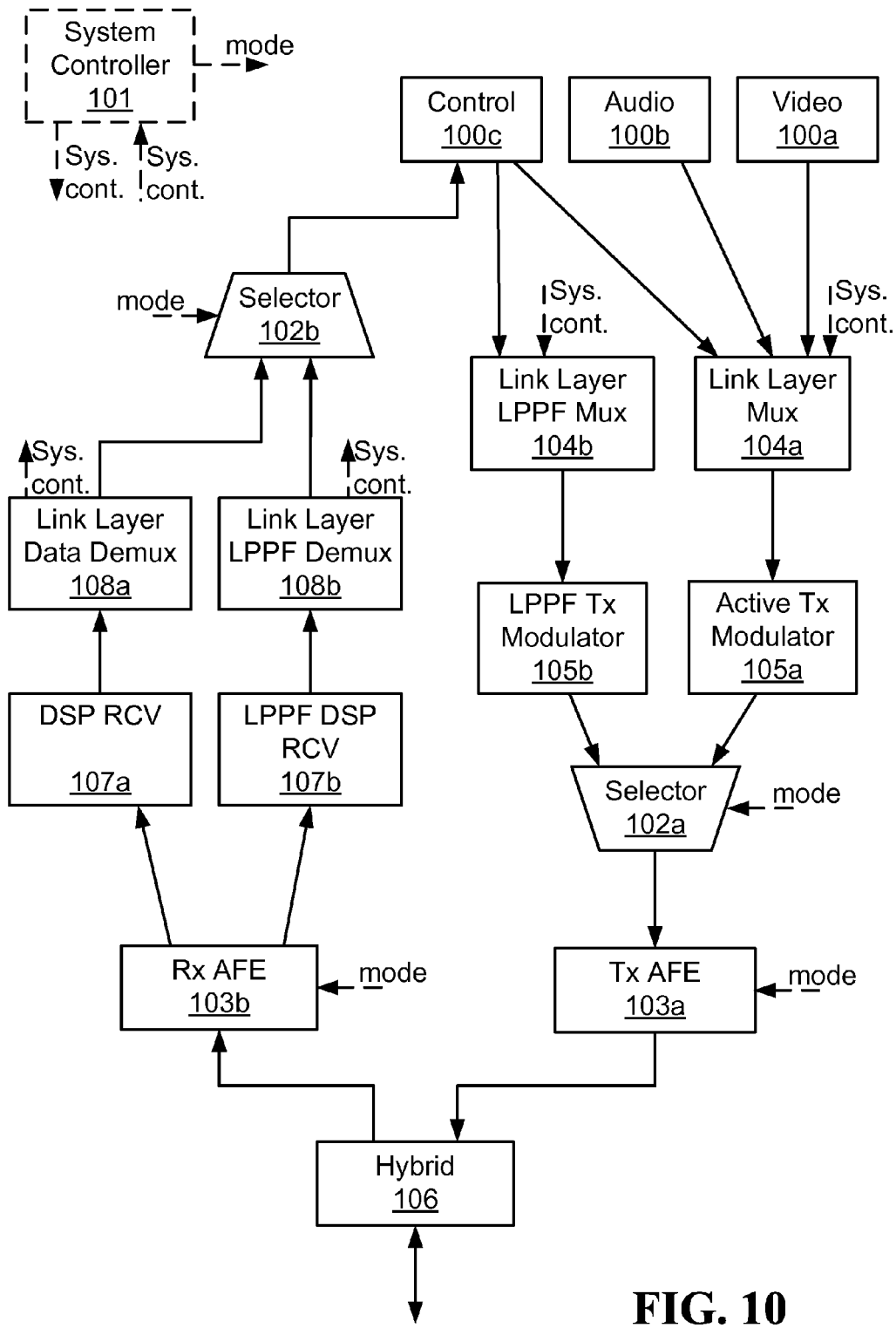
FIG. 10 illustrates a source side of a MDTCL in accordance with one embodiment of the invention.

FIG. 8 illustrates an optional configuration, including a source transceiver 81 and a sink transceiver 82, which is explained in detail by FIGS. 9 and 10. In the illustrated example, source transceiver 81 transmits to sink transceiver 82 video data and audio data; and bidirectional control data is transmitted between the source transceiver 81 and the sink transceiver 82. The video, audio and control data may be transmitted over the same wires.

FIG. 9 illustrates one embodiment of the sink side of a MDTCL, wherein the sink is a television, which receives a video stream 90a, an audio stream 90b, and a bidirectional control stream 90c. While the TV is in its active mode of operation, the optional system controller 91a sets selectors 91b and 91c to pass the active path and sets the analog front ends of the transmitted and the receiver (93a, 93b) to operate in their active mode of operation, according to the system controls received from the link layer data demultiplexer 98a. The system controller 91a also provides the system controls to the link layer data multiplexer 94a. The TV transmits the control stream 90c to the bidirectional communication medium through the active mode of operation version of the link layer data multiplexer 94a, the active mode of operation version of the transmit modulator 95a, the active mode of operation version of the transmitter's analog front end 93a, and the hybrid circuit 92. The TV receives the video stream 90a, the audio stream 90b, and the control stream 90c from the bidirectional communication medium through the hybrid circuit 92, the active mode of operation version of the receiver's analog front end 93b, the active mode of operation version of the DSP receiver 97a, and the active mode of operation version of the link layer data demultiplexer 98a.

While the TV is in its LPPF mode of operation, the optional system controller 91a sets selectors 91b and 91c to pass the LPPF path and sets the analog front ends of the transmitter and the receiver (93a, 93b) to operate in their LPPF mode of operation according to the system controls received from the link layer LPPF data demultiplexer 98b. The system controller 91a also provides the system controls to the link layer LPPF data multiplexer 94b. The TV transmits the a control stream 90c to the bidirectional communication medium through the LPPF mode of operation version of the link layer data multiplexer 94b, the LPPF mode of operation version of the transmit modulator 95b, the LPPF mode of operation version of the transmitter's analog front end 93a, and the hybrid circuit 92. The TV receives a control stream 90c from the bidirectional communication medium through the hybrid circuit 92, the LPPF mode of operation version of the receiver's analog front end 93b, the LPPF mode of operation version of the DSP receiver 97b, and the LPPF mode of operation version of the link layer data demultiplexer 98b.

FIG. 10 illustrates one embodiment of the source side of a MDTCL, wherein the source may be an STB, DVD, Blu-Ray, game console, PC, or any other device that transmits a video stream 100a, an audio stream 100b, and a bidirectional control stream 100c. While the source device is in its active mode of operation, the optional system controller 101 sets selectors 102a and 102b to pass the active path and sets the analog front ends of the transmitter and the receiver (103a, 103b) to operate in their active mode of operation according to the system controls received from the link layer data demultiplexer 108a. The system controller 101 also provides the system controls to the link layer data multiplexer 104a. The source device transmits a video stream 100a, an audio stream 100b, and a control stream 100c to the bidirectional communication medium through the active mode of operation version of the link layer LPPF data multiplexer 104a, the active mode of operation version of the transmit modulator 105a, the active mode of operation version of the transmitter's analog front end 103a, and the hybrid circuit 106. The source device receives a control stream 100c from the bidirectional communication medium through the hybrid circuit 106, the active mode of operation version of the receiver's analog front end 103b, the active mode of operation version of the DSP receiver 107a, and the active mode of operation version of the link layer data demultiplexer 108a.

While the source device is in its LPPF mode of operation, the system controller 101 sets selectors 102a and 102b to pass the LPPF path and sets the analog front ends of the transmitter and the receiver (103a, 103b) to operate in their LPPF mode of operation according to the system controls received from the link layer LPPF data demultiplexer 108b. The system controller 101 also provides the system controls to the link layer LPPF data multiplexer 104b. The source device transmits a control stream 100c to the bidirectional communication medium through the LPPF mode of operation version of the link layer data multiplexer 104b, the LPPF mode of operation version of the transmit modulator 105b, the LPPF mode of operation version of the transmitter's analog front end 103a, and the hybrid circuit 106. The source device receives a control stream 100c from the bidirectional communication medium through the hybrid circuit 106, the LPPF mode of operation version of the receiver's analog front end 103b, the LPPF mode of operation version of the DSP receiver 107b, and the LPPF mode of operation version of the link layer data demultiplexer 108b.

Ethernet Low Power Partial Functionality Operation Mode

In one embodiment, a modified Ethernet interface includes an LPPF mode of operation that transmits only a predefined set of data types. Ethernet with LPPF mode is especially useful when operating with consumer electronic devices, such as, but not limited to, display devices, or source devices such as STBs, DVD players, Video players, Blu-Ray players, game consoles, or multimedia servers.

In one example, a consumer electronic source device may use Ethernet for transferring, in its active mode of operation, video, audio, and control data to a display device. While the consumer electronic source device does not transmit video and audio data, for example, when it is in standby mode, the consumer electronic source device may still need to transmit some system controls and/or audio data, which consume much less bandwidth than consumed in the active mode of operation.

Figure 13:
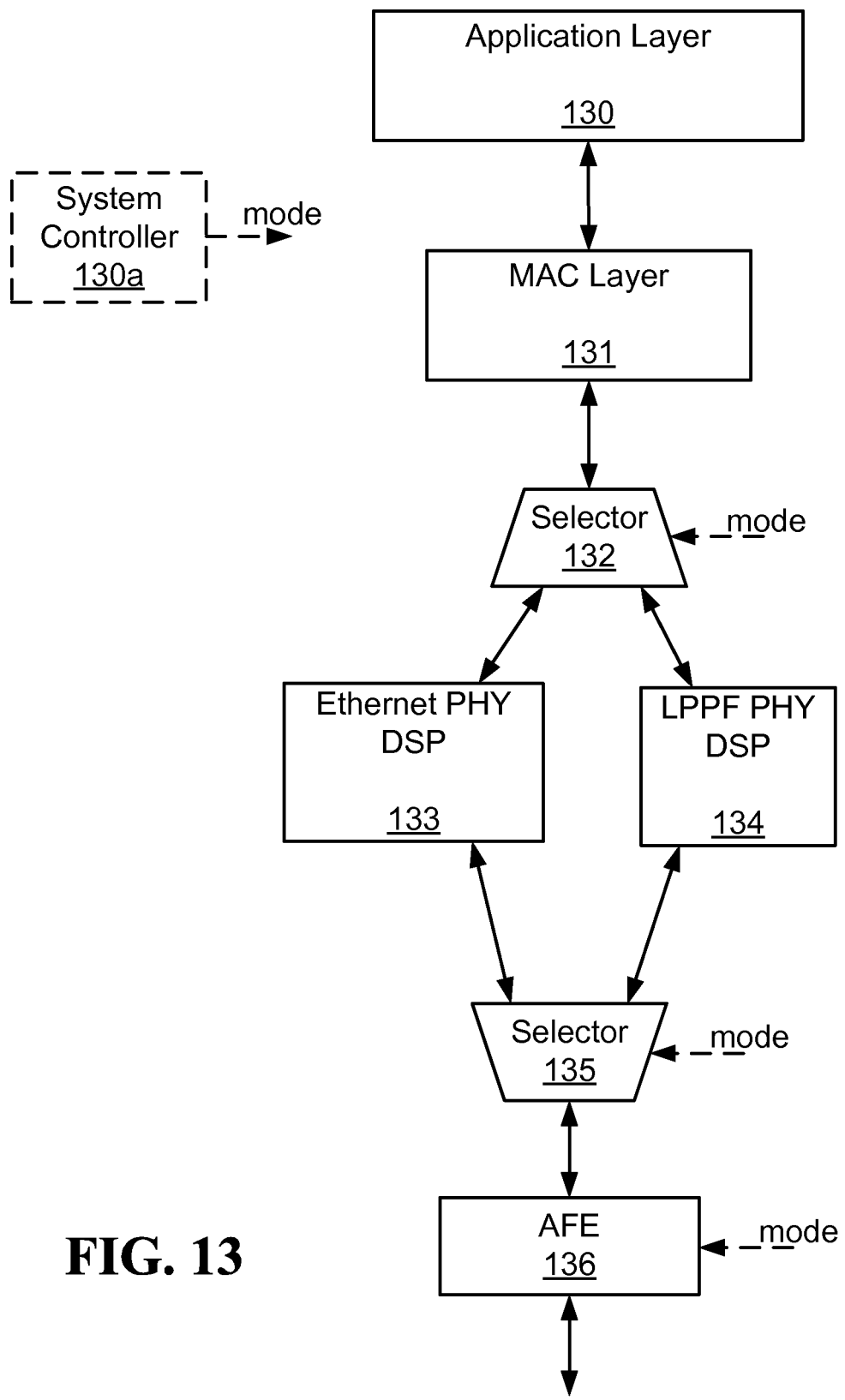
FIG. 13 illustrates a communication device in accordance with one embodiment of the invention.

FIG. 13 illustrates one embodiment of a communication device, also referred to as a modified Ethernet interface, having two types of PHY DSPs. The first PHY DSP is a standard Ethernet PHY DSP 133, and the second PHY DSP is an LPPF PHY DSP 134. The LPPF mode of operation may utilize one or more of the power reduction techniques described herein.

The data link layer (MAC) 131 of the modified Ethernet interface may operate the standard Ethernet PHY DSP 133 or the LPPF PHY DSP 134. The optional system controller 130*a* sets selectors 132 and 135 to pass the signals of the required mode of operation. Optionally, the analog front end 136 has also two modes of operation, corresponding to the two PHY modes of operation. In one embodiment, the MAC 131 determines which PHY to operate. In another embodiment, the application layer 130 determines which PHY to operate using the following steps:

The MAC 131 on a first side of the communication link receives from the application layer 130 an indication about the required mode of operation of the communication link, for example, active, #1 LPPF, or #2 LPPF modes of operation.

The MAC 131 communicates with the device on the other side of the communication link in order to coordinate the operation of the communication link. For example, the first device (connected to the first side of the communication link) may request from the second device (connected to the second side of the communication link) to switch from #1 LPPF mode to active mode; if the second device accepts the request, the communication link switches to active mode; if the second device does not accept the request, the communication link may stay in its current mode of operation, or switch to a predefined mode of operation such as the default mode of operation, or reset the link. In one embodiment, when one device connected to the communication link switches from the active mode to one of the LPPF modes, or from a comprehensive LPPF mode to slimmer LPPF mode, the device on the other side must also change its mode of operation.

In one embodiment, the application layer 130 determines which of the available physical layers to operate and which data types are to be transmitted over the communication link. In this case, only frames associated with the allowable data types are forwarded to the MAC 131; frames associated with other data types are not forwarded to the MAC 131. In one embodiment, the application layer 130 determines the type associated with each frame by communicating with the data sources. For example, a video source may be able to identify the data types of the frames it supplies, such as video data, audio data, and AV controls, and to forward that information to the application layer 130. In one embodiment, the application layer 130 determines the type associated with each frame according to the source of each frame. For example: an Ethernet port supplies a general data type; an HDMI port supplies a video data stream, an audio data stream and control streams; and an audio system provides an audio data stream.

In another embodiment, the application layer 130 sets the communication link's mode of operation and notifies the MAC 131 about the data type associated with each frame it receives. According to the selected mode of operation and the data type associated with each frame, the MAC 131 determines which frame will be transmitted over the communication link and selects the PHY that will be used for modulating the signals. For example, and with reference to FIG. 14, a DLNA server 140 is able to transmit high definition video and compressed video over Ethernet. In the active mode of operation, the MAC layer 141 transmits all the types of data it receives from the DLNA server 140 through 10 Gbps Ethernet PHY DSP 143. In the #1 LPPF mode of operation, the MAC layer 141 transmits only audio data and system control data it receives from the DLNA server 140 through #1 LPPF PHY DSP 144. In the #2 LPPF mode of operation, the MAC layer 141 transmits only system control data it receives from the DLNA server 140 through #2 LPPF PHY DSP 144. The power consumption of the 10 Gbps Ethernet PHY DSP 143 is significantly higher than the power consumption of the #1 LPPF PHY DSP 144 which is significantly higher than the power consumption of the #2 LPPF PHY DSP 145.

Figure 14:
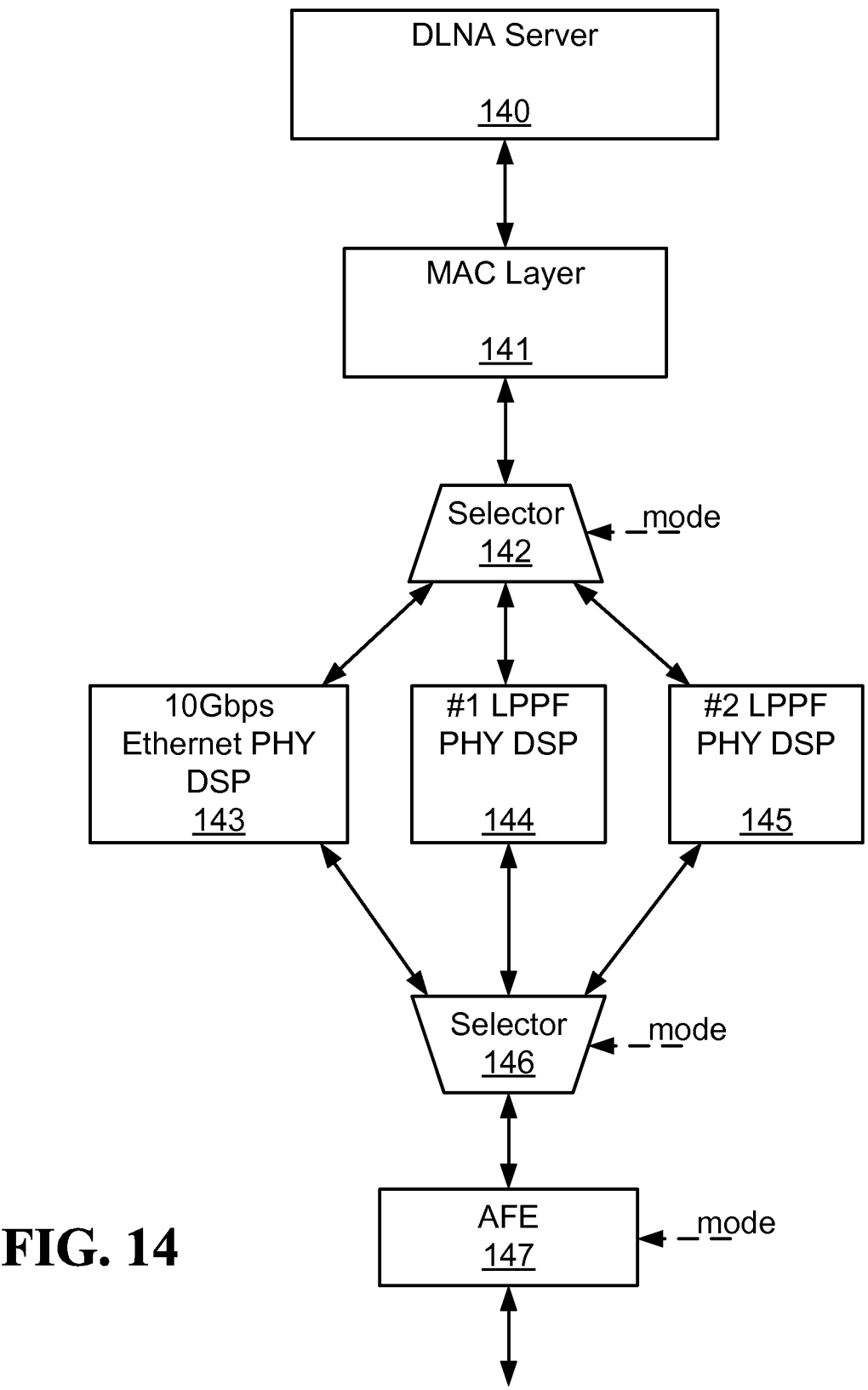
FIG. 14 illustrates a communication device in accordance with one embodiment of the invention.
Figure 15:
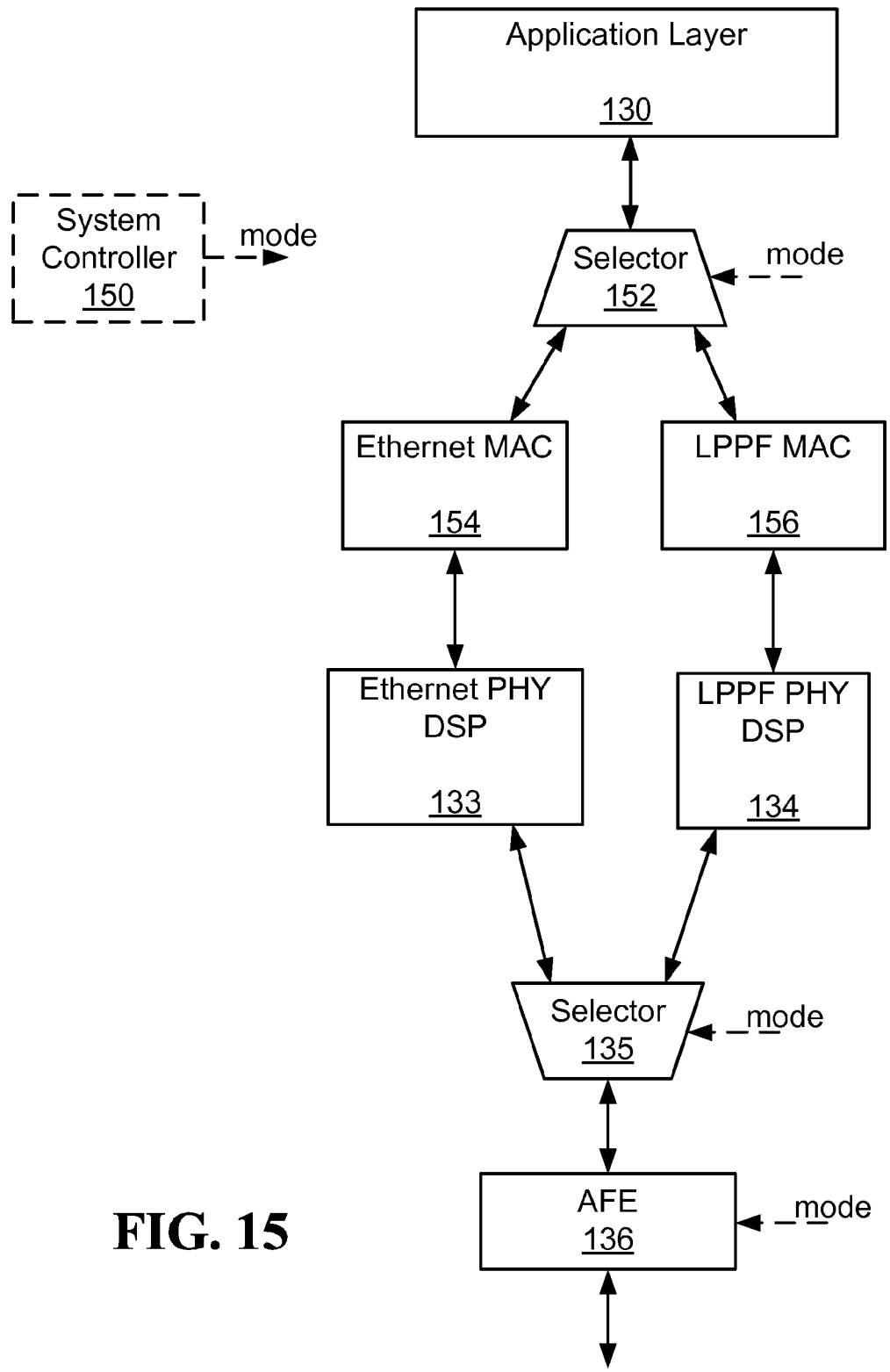
FIG. 15 illustrates a communication device in accordance with one embodiment of the invention.

It is to be understood that FIGS. 13 and 14 may be amended to include designated data link layers for each mode of operation, similar to the structures illustrated in FIGS. 9 and 10. FIG. 15 illustrates a variation of FIG. 13 including separate MACs for the Ethernet path and the LPPF path. The Ethernet MAC 154 and the LPPF MAC 156 communicate with application layer 130 through selector 152 that is optionally operated by system controller 150.

In one embodiment, the LPPF mode does not change the structure of the Ethernet frame. Maintaining the frame structure enables smooth transitions between network hops. In one embodiment, the LPPF mode and the active mode utilize different frame structures. Utilizing different frame structures may improve the efficiency and reduce overheads.

Diva Low Power Partial Functionality Operation Mode

Figure 11:
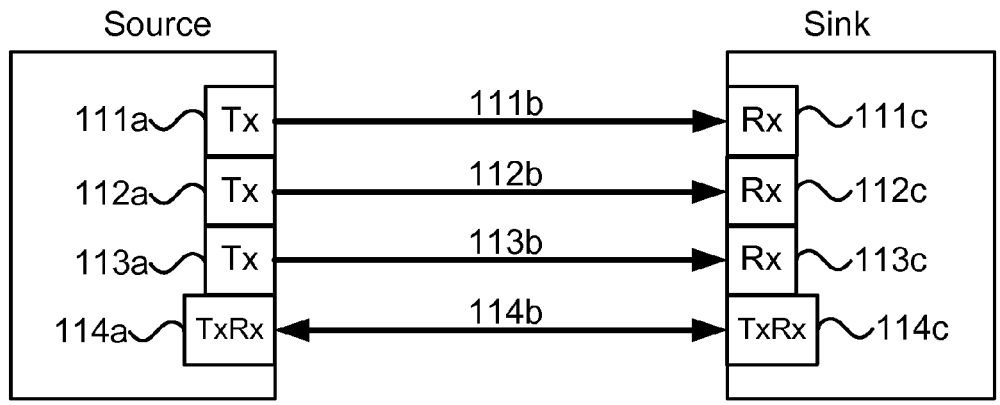
FIG. 11 illustrates a multimedia system in accordance with one embodiment of the invention.

It is to be understood that although the name "DIVA" is used herein, the claimed invention should not be limited, in any way, to the Digital Interface for Video and Audio (DIVA) initiated by a working group of some leading Chinese consumer electronics companies, described in http://www.diva-interface.org FIG. 11 illustrates one embodiment of a multimedia system including four pairs of wires. Uncompressed video data and uncompressed audio data, optionally multiplexed with video control data, are transmitted by three transmitters (111*a*, 112*a*, 113*a*), over three links (111*b*, 112*b*, 113*b*), to three receivers (111*c*, 112*c*, 113*c*). Transceivers 114*a* and 114*c* form a bidirectional MDTCL 114*b*. In one embodiment, approximately 4.5 Gbps of video and audio are transmitted over three links (111*b*, 112*b*, 113*b*), and 4.5 Gbps of data is transmitted, half-duplex, over the fourth link 114*b*. Optionally, each of the four communication links (111*b*, 112*b*, 113*b*, and 114*b*) is made of a pair of copper wires. Optionally, the transmissions are SerDes (Serializer/Deserializer).

Figure 12:
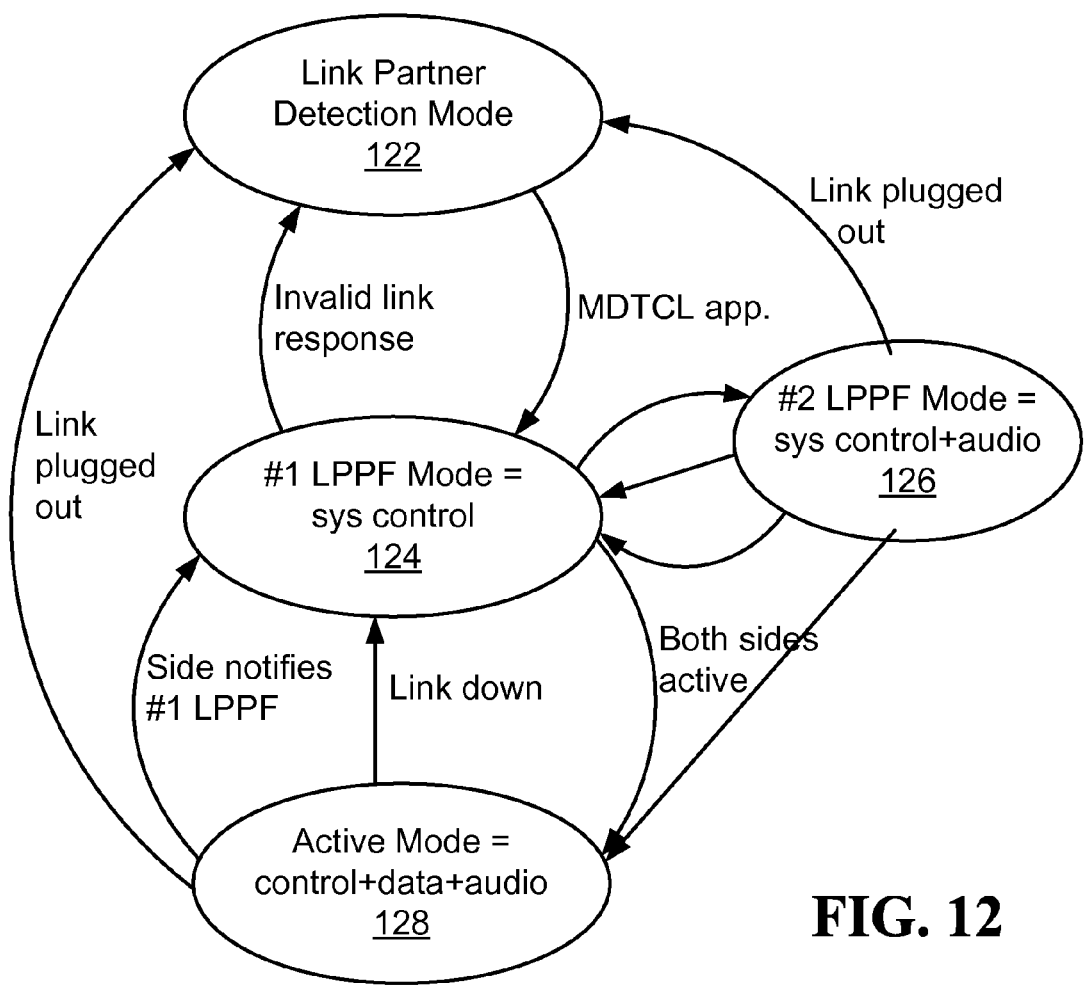
FIG. 12 illustrates one embodiment of a state machine of a MDTCL in accordance with one embodiment of the invention.

FIG. 12 illustrates one embodiment of the state machine of MDTCL 114*b* of FIG. 11 adapted to DIVA. The MDTCL 114*b* may transfer, in its active mode of operation 128, the following data types over a pair of wires: bidirectional system control data, bidirectional general data, and optional unidirectional audio data from transceiver 114*c* to transceiver 114*a*. Optionally, the general data includes Ethernet Data. The MDTCL 114*b* may feature one or more of the following LPPF modes of operation: (i) a first optional LPPF mode of operation 124 for transferring bidirectional system controls; (ii) a second optional LPPF mode of operation 126 for transferring bidirectional system controls and unidirectional audio from transceiver 114*c* to transceiver 114*a*; or (iii) a third optional LPPF mode of operation (not illustrated in the figure) for transferring bidirectional system controls and bidirectional general data in a rate that is lower than the transfer rate of the bidirectional data utilized by the active mode of operation. For example, in its active mode of operation, the system may transmit half duplex general data in a rate of 4.5 Gbps, while in its third LPPF mode of operation, the system may transmit half duplex general data in a rate of 1 Gbps, 100 Mbps, 10 Mbps, or 1 Mbps.

The LPPF mode of operation may utilize one or more of the power reduction techniques described herein. For example, operating the MDTCL 114*b* using different rates, using a smaller amplitude, and/or transmitting over the link only when there is a need to transmit data.

Although the embodiments have been described in considerable detail with reference to certain embodiments thereof, other embodiments are possible.

Certain features of the embodiments, which may, for clarity, be described in the context of separate embodiments, may also be provided in various combinations in a single embodiment. Conversely, various features of the embodiments, which may, for brevity, be described in the context of a single embodiment, may also be provided separately or in any suitable sub-combination.

The embodiments are not limited in their applications to the details of the order or sequence of steps of operation of methods, or to details of implementation of devices, set in the description, drawings, or examples.

While the methods disclosed herein have been described and shown with reference to particular steps performed in a particular order, it will be understood that these steps may be combined, sub-divided, or reordered to form an equivalent method without departing from the teachings of the embodiments. Accordingly, unless specifically indicated herein, the order and grouping of the steps is not a limitation of the embodiments.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents. In the claims, means-plus-function clauses are intended to cover the structures described herein as performing the recited function and not only structural equivalents, but also equivalent structures.

What is claimed is:

1. A transceiver configured to operate according to different modes of operation:
   the transceiver is configured to operate according to a first mode of operation in order to transmit in a first direction bidirectional communication comprising data of at least two types, over a certain wire comprised in a cable, wherein at least one of the data types is uncompressed high definition digital video and another data type is bidirectional data; the transceiver is further configured to receive in a second direction, while operating in the first mode of operation, data of the bidirectional data type;
   the transceiver is further configured to operate according to a first low power partial functionality mode of operation in order to transmit and receive bidirectional communication comprising bidirectional data over the certain wire; and
   the transceiver is further configured to transmit at least one data type in the first mode of operation that is not transmitted in the first low power partial functionality mode of operation;
   wherein the ratio between power consumption of the transceiver in the first mode of operation and the power consumption of the transceiver in the first low power partial functionality mode of operation is at least 3:1.

2. The transceiver of claim 1, wherein the first low power partial functionality mode of operation is used for transmitting at least one of the following data types: Display Data Channel (DDC), Extended display identification data (EDID), Consumer Electronics Control (CEC), Hot Plug detect (HPD), 5v indication, internal link control, and auto-negotiation.

3. The transceiver of claim 2, wherein the cable comprises four pairs of conductive wires, and the first mode of operation is used for transmitting the uncompressed high definition digital video over the four pairs of the conductive wires, and the first low power partial functionality mode of operation transmits over no more than two pairs of the conductive wires.

4. The transceiver of claim 2, wherein the cable is selected from the group of: CAT5, CAT5e, CAT6, CAT6a, or CAT7.

5. The transceiver of claim 2, wherein the transmissions of the first mode of operation and the first low power partial functionality mode of operation comprise data types defined by one or more of the following interfaces: DVI, HDMI, or DisplayPort.

6. The transceiver of claim 1, wherein the uncompressed high definition digital video utilizes at least 90% of the total bandwidth utilized by the first mode of operation.

7. The transceiver of claim 1, wherein the first low power partial functionality mode of operation is further used for transmitting digital audio.

8. The transceiver of claim 1, wherein the first low power partial functionality mode of operation is a standby mode of operation.

9. The transceiver of claim 1, wherein the first mode of operation is further used for transmitting audio data.

10. The transceiver of claim 1, wherein the ratio between the power consumption of the first mode of operation and the power consumption of the first low power partial functionality mode of operation is at least approximately 20:1.

11. The transceiver of claim 1, wherein the power consumed by the first low power partial functionality mode of operation is smaller than 0.5 Watt.

12. The transceiver of claim 1, further comprising a second low power partial functionality mode of operation used for transmitting over the certain wire; and the second low power partial functionality mode of operation transfers at least one data type that is not transferred by the first low power partial functionality mode of operation, and provides at least one functionality that is not provided by the first low power partial functionality mode of operation.

13. The transceiver of claim 12, wherein the second low power partial functionality mode of operation consumes more power than the first low power partial functionality mode of operation and consumes less power than the first mode of operation.

14. The transceiver of claim 12, wherein the mode of operation of the transceiver is determined according to one or more of the following: the transmitted bandwidth, the type of transmitted data, or the required functionality of the communication link.

15. A communication device comprising a transceiver according to claim 1 for transmitting unidirectional uncompressed high definition digital video unidirectionally and a receiver for receiving unidirectional uncompressed high definition digital video.

16. A communication link comprising transceivers coupled by a cable, the transmitters configured to operate according to different modes of operation:

the transceivers are configured to operate according to a first mode of operation for transmitting data of at least two types, over a certain wire comprised in the cable, wherein at least one of the data types is uncompressed high definition digital video transmitted from a source device to a sink device and another data type is bidirectional data transmitted in a first direction between the source device and the sink device;

the transceivers are further configured to transmit the bidirectional data in a second direction over the certain wire, while operating in the first mode of operation;

the transceivers are further configured to operate according to a first low power partial functionality mode of operation for transmitting a second bidirectional data between the source device and the sink device over the certain wire; and the transceivers are further configured to transmit in the first bidirectional data at least one data type that is not transmitted in the second bidirectional data;

wherein ratio between power consumption of the transceivers in the first mode of operation and power consumption of the transceivers in the first low power partial functionality mode of operation is at least 3:1.

17. The communication link of claim 16, wherein the cable comprises four pairs of conductive wires, the first mode of operation is used for transmitting the uncompressed high definition digital video over the four pairs of the conductive wires, and the first low power partial functionality mode of operation transmits over no more than two pairs of the conductive wires.

18. The communication link of claim 16, wherein the first low power partial functionality mode of operation is a standby mode of operation.

19. The communication link of claim 16, wherein the first mode of operation is further used for transmitting audio data.

20. The communication link of claim 16, wherein the first low power partial functionality mode of operation is used for transmitting at least one of the following: Display Data Channel (DDC), Extended display identification data (EDID), Consumer Electronics Control (CEC), Hot Plug detect (HPD), 5v indication, internal link control, and auto-negotiation.

21. The communication link of claim 17, wherein the cable is selected from the group of: CAT5, CAT5e, CAT6, CAT6a, or CAT7.

22. The communication link of claim 17, wherein the transmissions of the first mode of operation and the first low power partial functionality mode of operation comprise data types defined by one or more of the following interfaces: DVI, HDMI, or DisplayPort.

23. The communication link of claim 16, wherein the first low power partial functionality mode of operation is further used for transmitting digital audio from the source device to the sink device.

24. The communication link of claim 16, wherein the first low power partial functionality mode of operation is further used for transmitting digital audio from the sink device to the source device.

25. The communication link of claim 16, wherein the uncompressed high definition digital video utilizes at least 90% of the total bandwidth utilized by the first mode of operation.

26. The communication link of claim 16, wherein the power consumed by the first low power partial functionality mode of operation is smaller than 0.5 Watt.

27. The communication link of claim 16, wherein the ratio between the power consumption of the first mode of operation and the power consumption of the first low power partial functionality mode of operation is at least approximately 20:1.

28. The communication link of claim 16, further comprising a second low power partial functionality mode of operation used for transmitting over the certain wire; and the second low power partial functionality mode of operation transfers at least one data type that is not transferred by the first low power partial functionality mode of operation, and provides at least one functionality that is not provided by the first low power partial functionality mode of operation.

* * * * *